(12) United States Patent
Morgan

(10) Patent No.: US 6,348,181 B1
(45) Date of Patent: Feb. 19, 2002

(54) PROCESS FOR PRODUCING CARBON BLACKS

(75) Inventor: Allan C. Morgan, Manchester-by-the-Sea, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 08/077,599

(22) Filed: Jun. 15, 1993

(51) Int. Cl.[7] .................................................. C09C 1/50
(52) U.S. Cl. ...................................... 423/449.1; 423/450
(58) Field of Search .......................... 423/449.1, 449.8, 423/450

(56) References Cited

U.S. PATENT DOCUMENTS

| | | | |
|---|---|---|---|
| 2,785,964 A | 3/1957 | Pollock | 23/314 |
| 3,175,888 A | 3/1965 | Krejci | 23/259.5 |
| 3,401,020 A | 9/1968 | Kester et al. | 23/209.4 |
| 3,445,190 A | 5/1969 | Kallenberger | 23/209.4 |
| 3,595,622 A | 7/1971 | Johnson | 23/259.5 |
| 3,645,685 A | 2/1972 | Crouch | 23/209.4 |
| 3,922,335 A | 11/1975 | Jordan et al. | 423/450 |
| RE28,974 E | 9/1976 | Morgan et al. | 423/450 |
| 3,993,447 A | 11/1976 | Buss et al. | 23/259.5 |
| 4,071,496 A * | 1/1978 | Kraus et al. | 423/449.1 |
| 4,165,364 A | 8/1979 | Dollinger et al. | 423/456 |
| 4,213,939 A | 7/1980 | Ruble | 422/151 |
| 4,241,022 A | 12/1980 | Kraus et al. | 422/156 |
| 4,327,069 A * | 4/1982 | Cheng | 423/450 |
| 4,368,182 A * | 1/1983 | Mills et al. | 423/450 |
| 4,372,936 A * | 2/1983 | Surovikin et al. | 423/450 |
| 4,383,973 A | 5/1983 | Cheng | 422/151 |
| 4,393,034 A | 7/1983 | Smith | 423/450 |
| 4,619,812 A | 10/1986 | Murray | 422/156 |
| 4,664,901 A | 5/1987 | Henderson | 423/450 |
| 4,824,643 A | 4/1989 | Gravley et al. | 422/151 |
| 4,879,104 A | 11/1989 | List et al. | 423/450 |
| 5,069,882 A | 12/1991 | Jones, Jr. | 422/150 |
| 5,252,297 A | 10/1993 | Nakai | 422/150 |
| 5,262,146 A | 11/1993 | Kanamaru et al. | 423/455 |

FOREIGN PATENT DOCUMENTS

| | | | |
|---|---|---|---|
| EP | 0 392 121 | 10/1990 | C09C/1/50 |
| GB | 1150423 | 4/1969 | C09C/1/48 |
| GB | 2086873 | 5/1982 | C09C/1/48 |
| JP | 3-33167 | 2/1991 | |
| WO | WO 93/18094 | 9/1993 | C09C/1/50 |

OTHER PUBLICATIONS

International Search Report, Oct. 13, 1994, for PCT/US94/05926.

\* cited by examiner

*Primary Examiner*—Stuart L. Hendrickson

(57) ABSTRACT

A process for producing carbon black comprising reacting a reaction stream formed by a prior carbon black forming process with an oxidant and a carbon black yielding feedstock to produce carbon black and cooling, separating and recovering the carbon black. The process advantageously reduces the amount of fuel needed to produce carbon black. Also disclosed is an apparatus for practicing the process.

14 Claims, 1 Drawing Sheet

PROCESS FOR PRODUCING CARBON BLACKS

FIELD OF THE INVENTION

The present invention relates to a new process and apparatus for producing furnace carbon blacks.

BACKGROUND

Carbon blacks are widely utilized as pigments in ink compositions, paints and the like; as fillers and reinforcing pigments in the compounding and preparation of rubber compositions and plastic compositions, and for a variety of other applications. Carbon blacks are generally characterized on the basis of their properties including, but not limited to, their surface areas, surface chemistry, aggregate sizes and particle sizes. The properties of carbon blacks are analytically determined by tests known to the art.

Carbon blacks are generally produced in a furnace-type reactor by reacting a hydrocarbon feedstock with hot combustion gases to produce combustion products containing particulate carbon black. In the carbon black literature, this reaction between the combustion gases and the hydrocarbon feedstock is generally referred to as pyrolysis.

A variety of methods for producing carbon blacks are generally known. In one type of a carbon black furnace reactor, such as shown in U.S. Pat. No. 3,401,020 to Kester et al., or U.S. Pat. No. 2,785,964 to Pollock, hereinafter "Kester" and "Pollock" respectively, a fuel, preferably hydrocarbonaceous, and an oxidant, preferably air, are injected into a first zone and react to form hot combustion gases. A hydrocarbon feedstock in either gaseous, vapor or liquid form is also injected into the first zone whereupon reaction of the hydrocarbon feedstock commences. The resulting combustion gas mixture, in which the reaction is occurring, then passes into a reaction zone where completion of the carbon black forming reaction occurs.

In another type of carbon black furnace reactor a liquid or gaseous fuel is reacted with an oxidant, preferably air, in the first zone to form hot combustion gases. These hot combustion gases pass from the first zone, downstream through the reactor, into a reaction zone and beyond. To produce carbon blacks, a hydrocarbonaceous feedstock is injected at one or more points into the path of the hot combustion gas stream. The hydrocarbonaceous feedstock may be liquid, gas or vapor, and may be the same or different than the fuel utilized to form the combustion gas stream. Generally the hydrocarbonaceous feedstock is a hydrocarbon oil or natural gas. The first (or combustion) zone and the reaction zone may be divided by a choke or zone of restricted diameter which is smaller in cross section than the combustion zone or the reaction zone. The feedstock may be injected into the path of the hot combustion gases upstream of, downstream of, and/or in the restricted diameter zone. The hydrocarbon feedstock may be introduced in atomized and/or non-pre atomized form, from within the combustion gas stream and/or from the exterior of the combustion gas stream. Carbon black furnace reactors of this type are generally described in U.S. Reissue Pat. No. 28,974, to Morgan et al., and U.S. Pat. No. 3,922,335, to Jordan et al., the disclosure of each being incorporated herein by reference.

In generally known reactors and processes, the hot combustion gases are at a temperature sufficient to effect the reaction of the hydrocarbonaceous feedstock injected into the combustion gas stream. In one type of reactor, such as disclosed in Kester, feedstock is injected, at one or more points, into the same zone where combustion gases are being formed. In other type reactors or processes, the injection of the feedstock occurs, at one or more points, after the combustion gas stream has been formed. The mixture of feedstock and combustion gases in which the reaction is occurring is hereinafter referred to, throughout the application, as "the reaction stream". The residence time of the reaction stream in the reaction zone of the reactor is sufficient to allow the formation of desired carbon blacks. In either type of reactor, since the hot combustion gas stream is flowing downstream through the reactor, the reaction occurs as the mixture of feedstock and combustion gases passes through the reaction zone. After carbon blacks having the desired properties are formed, the temperature of the reaction stream is lowered to a temperature such that the reaction is stopped.

U.S. Pat. No. 4,327,069, to Cheng ("Cheng '069"), and its divisional, U.S. Pat. No. 4,383,973, to Cheng ("Cheng '973"), disclose a furnace and a process for producing carbon black having a low tint residual utilizing two carbon black reactors. "Each of the carbon black reactors has a precombustion section, a reaction section, hydrocarbon inlet means, and hot combustion gas inlet means". Cheng '973, Col. 4, 11. 16–19. One of the reactors is a high-structure carbon black reactor, and the other reactor is a low-structure carbon black reactor. Cheng '973, Abstract. "A second flow of hot combustion gases formed by the combustion of a second fuel stream and a second oxygen containing stream is established in the second carbon black forming zone. A second stream of hydrocarbon feedstock is introduced into the second carbon black forming zone of the furnace into admixture with the second flow of hot combustion gases established therein as well as with the first carbon black forming mixture coming from the first carbon black forming zone of the furnace." Cheng '973, Col. 2, 11. 19.

SUMMARY OF THE INVENTION

I have discovered that it is possible to reduce the amount of fuel utilized to produce carbon black by reacting the reaction stream of a prior carbon black forming process with an oxidant to generate a stream of combustion products that will react with carbon black yielding feedstock to produce carbon black. The generation of this stream of combustion products may be accomplished by introducing any suitable oxidant, which may be any oxygen containing material such as air, oxygen, mixtures of air and oxygen, or other like materials into the reaction stream. The resulting stream of combustion products is reacted with additional carbon black yielding feedstock to produce carbon black. As a result, the amount of fuel utilized for producing carbon black is reduced.

Accordingly, the process of the present invention is a process for producing carbon black comprising:
  reacting a reaction stream formed by a prior carbon black forming process with an oxidant and a carbon black yielding feedstock to produce carbon black; and
  cooling, separating and recovering the carbon black.

Preferably, the process further comprises:
  forming the reaction stream by a process comprising reacting a fuel with an oxidant and a carbon black yielding feedstock; and
  reacting the reaction stream with oxidant and carbon black yielding feedstock under conditions that reduce the amount of fuel utilized to produce the total amount of carbon black produced by the process. The fuel reduction is observed in the amount of fuel utilized per pound of carbon black produced by the process when compared to the amount of fuel utilized per pound of carbon black to form the reaction stream. More particularly, the amount of fuel utilized, per pound of carbon black, to produce the total amount of carbon black produced by the process, is less than the amount of fuel, per pound of carbon black, utilized to produce a carbon black, of not less than substantially the same CTAB surface area, by the process which formed the reaction stream. If one operates a typical carbon black producing process to produce a carbon black of a given CTAB surface area, and, prior to cooling, separating and recovering the carbon black, reacts the reaction stream with an oxidant and carbon black yielding feedstock, according to the process of the present invention, it is possible and practicable to produce more total carbon black of not less than substantially the same CTAB surface area at a lower specific fuel consumption (BTU/pound of carbon black) than the typical carbon black forming process preceding the reaction between the reaction stream and the oxidant and carbon black yielding feedstock. Preferably, the reduction in the amount of fuel is at least 2%.

As will be understood by those of ordinary skill in the art, the process steps of reacting a reaction stream with an oxidant and a carbon black yielding feedstock to produce carbon black may be repeated, as often as practicable, prior to cooling, separating and recovering the carbon black.

From the Examples described herein, and cited in Tables 4 and 5 below, it is evident to one of ordinary skill in the carbon black art that significant fuel savings have been achieved by the practice of my invention. In the Examples, the reaction stream was generated in a carbon black furnace reactor similar to those described in U.S. Reissue Pat. No. 28,974, to Morgan et al., and U.S. Pat. No. 3,922,335, to Jordan et al. However, the process of the present invention may be performed using any means of forming the reaction stream. For example, the process of the present invention may be performed, and useful fuel savings could be achieved, utilizing a reaction stream formed in the following generally known types of reactors: a typical carbon black furnace reactor of the type described in U.S. Pat. No. 2,641,534; and a set of thermal carbon black reactors appropriately ganged and valved so as to provide a substantially continuous reaction stream.

"Oxidant", as used herein, refers to any oxidizing agent suitable for maintaining a fire, such as, for example, air, oxygen and mixtures thereof, with air being the preferred oxidant. The process of the present invention may even gainfully employ air with reduced oxygen content. It is within the context of the present invention to vary the composition of the oxidant, through the introduction of additives.

Oxidant may be introduced into the reaction stream in any manner known to the art. For example, and preferably, the oxidant may be introduced by attaching a conduit to a port through the walls of the reactor. However, oxidant should be introduced in a manner, or the reactor configured in a manner, such that the oxidant is rapidly mixed into the reaction stream. The mixing of the oxidant into the reaction stream may be accomplished by methods which include, but are not limited to, the following methods: introducing the oxidant under sufficient pressure to penetrate the reaction stream; or configuring the reactor to include a recirculation zone to allow the mixing of the oxidant into the reaction stream.

Carbon black-yielding hydrocarbon feedstocks, which are readily volatilizable under the conditions in the reactor, include unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like.

Carbon black yielding feedstock may be introduced into the reaction stream simultaneously with or subsequent to the introduction of the oxidant. The feedstock may be introduced in atomized and/or non-pre atomized form from within the reaction stream, and/or from the exterior of the reaction stream. The time between the introduction of the oxidant, and the introduction of the carbon black yielding feedstock, should allow sufficient time for the mixing of the oxidant and the reaction stream, such that the reaction between the oxidant and the reaction stream generates a stream of combustion products to react the carbon black yielding feedstock.

Preferably, in the process of the present invention, the time between the introduction of the oxidant and the introduction of the carbon black yielding feedstock is less than 30 milliseconds, more preferably less than 10 milliseconds, most preferably less than 5 milliseconds.

Introduction of the oxidant into the reaction stream generates sufficient heat to react the carbon black yielding feedstock. The reaction stream may then be passed into another reaction zone to permit the introduction of additional oxidant and additional carbon black yielding feedstock according to the process of the present invention.

After carbon blacks having the desired properties are formed the temperature of the reaction stream may be lowered, in any manner known to the art, such as by injecting a quenching fluid, through a quench, into the reaction stream. One way of determining when the reaction should be stopped is by sampling the reaction stream and measuring its toluene discoloration level. Toluene discloration is measured by ASTM D1618-83 "Carbon Black Extractables—Toluene Discoloration". The quench is generally located at the point where the toluene discoloration level of the reaction stream reaches an acceptable level for the desired carbon black product being produced. After the reaction stream has been cooled, the reaction stream may be passed through a bag filter system to separate and collect the carbon black.

An apparatus for carrying out the process of the present invention comprises:
  means for reacting a reaction stream formed by a prior carbon black forming process with an oxidant and a carbon black yielding feedstock to produce carbon black; and
  means for cooling, separating and recovering the carbon black.

Preferably, the apparatus comprises a plurality of reactor zones in which a reaction stream is formed in a first reaction zone and flows into at least one subsequent reaction zone wherein oxidant and carbon black yielding feedstock are introduced to form carbon black. After the formation of carbon black, the reaction stream is cooled and the carbon black separated and recovered. It is therefore within the contemplation of this invention that the reaction stream may be allowed to flow downstream into additional reaction zones for the introduction of further oxidant and carbon black yielding feedstock.

Other details and advantages of the process and apparatus of the present invention will become apparent from the following more detailed description.

DETAILED DESCRIPTION OF THE INVENTION

Figure 1:
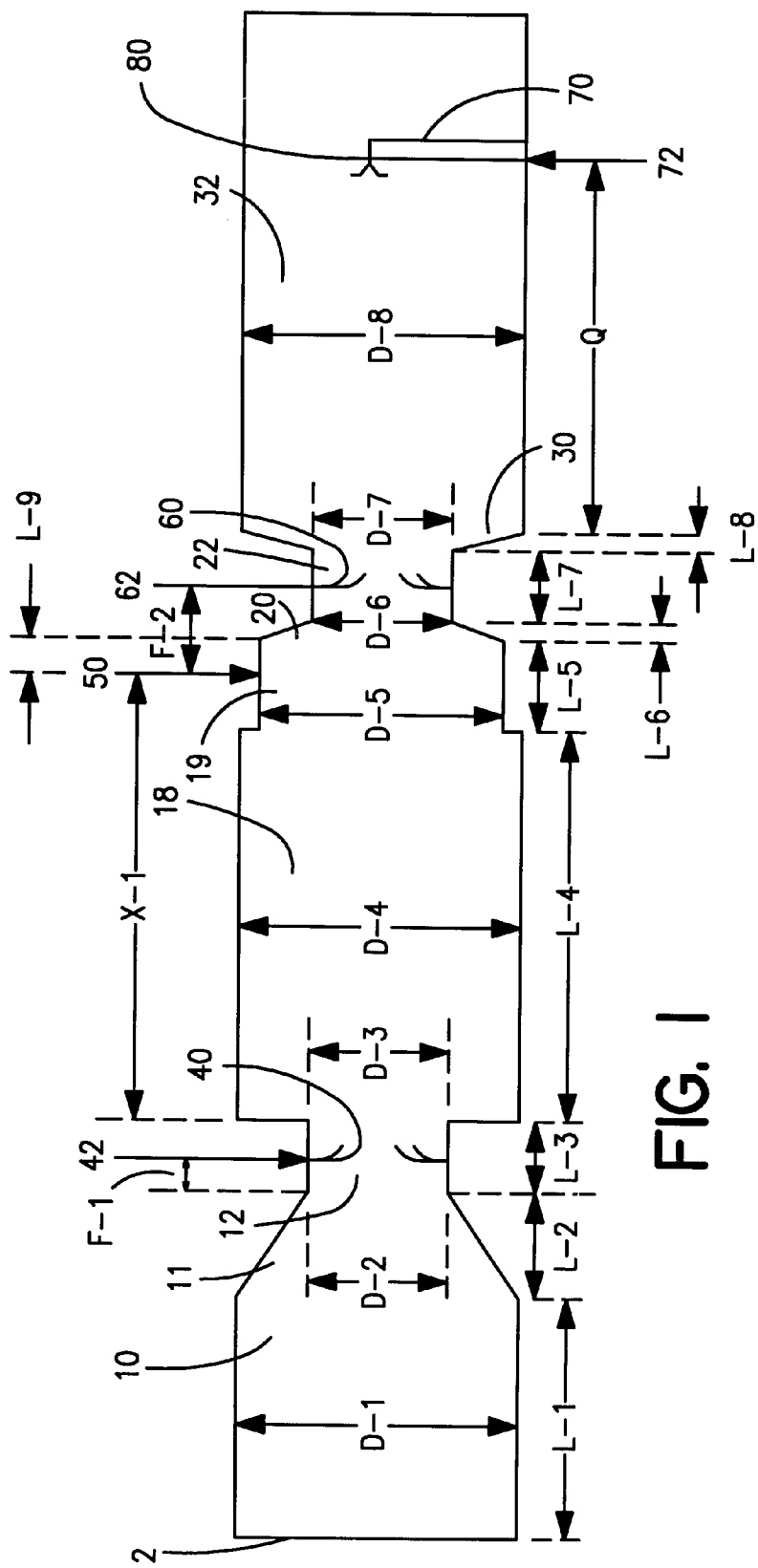
FIG. 1 is a cross-sectional diagram of a carbon black reactor of the present invention that may be utilized to perform the process of the present invention.

As set forth above, the process and apparatus of the present invention result from my discovery that it is possible to reduce the amount of fuel utilized to produce carbon black by reacting the reaction stream of a prior carbon black forming process with an oxidant to generate a stream of combustion products that will react with carbon black-yielding feedstock to produce carbon black. By mixing an oxidant into the reaction stream, it is practicable to generate a stream of combustion products to react additional carbon black yielding feedstock introduced simultaneously with or subsequent to the introduction of the oxidant.

A carbon black reactor which may be utilized to perform the process of the present invention is depicted in FIG. 1. Although one type of carbon black reactor is depicted in FIG. 1, it is to be understood that the present invention can be used in any carbon black furnace reactor in which carbon black is produced by reaction of hydrocarbons.

It will also be recognized that the carbon black reactor depicted in FIG. 1 constitutes an apparatus of the present invention. However, the apparatus of the present invention is not limited to the configuration depicted in FIG. 1.

Referring to FIG. 1, the process of the present invention may be practiced in a carbon black furnace reactor 2, having: a combustion zone 10, which has a zone of converging diameter 11; a feedstock injection zone 12, and reaction zone 18. In the embodiment depicted in FIG. 1, reaction zone 18 includes a zone of a smaller inner diameter, 19 connected to a zone of converging diameter 20 which communicates with a feedstock injection zone 22, having a smaller diameter than reaction zone 18. The feedstock injection zone 22, is attached to reaction zone 32. In the embodiment depicted in FIG. 1, reaction zone 32 includes a zone of diverging diameter 30.

For purposes of the Examples described below, the diameter of the combustion zone, 10, up to the point where the zone of converging diameter, 11, begins is shown as D-1; the diameter of the converging zone, 11, at the narrowest point, is shown as D-2; the diameter of zone 12, as D-3, the diameter of zone, 18, as D-4, the diameter of zone 19, as D-5, the diameter of the converging zone 20, at the narrowest point, as D-6, the diameter of zone 22 as D-7 and the diameter of zone 30, at the narrowest point as D-7 and the diameter of zone 32 as D-8. Similarly, for purposes of the Examples described below, the length of the combustion zone 10, up to the point where the zone of converging diameter, 11, begins is shown as L-1; the length of the zone of converging diameter, 11, is shown as L-2; the length of the feedstock injection zone, 12, is shown as L-3; the length of reaction zone, 18, up to the point of the zone of smaller diameter, 19 is shown as L-4; the length of zone 19 is shown as L-5; the length of zone 20 of converging diameter is shown as L-6; the length of transition zone 22 is shown as L-7; and the length of the zone of diverging diameter 30, as L-8. L-9 is the length of the reactor section from the midplane of the point of oxidant introduction (50) to the beginning of the zone of converging diameter (20).

In the practice of the process of the present invention, hot combustion gases are generated in zone 10 by contacting liquid or gaseous fuel with a suitable oxidant stream such as air, oxygen, mixtures of air and oxygen or the like. Among the fuels suitable for use in contacting the oxidant stream in combustion zone 10 to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. Operations with fuel equivalence ratios between 10 and 125% are generally preferred when air is used as the oxidant in the combustion reaction in the first zone. As understood by those of ordinary skill in the art, to facilitate the generation of hot combustion gases, the oxidant stream may be preheated.

The hot combustion gas stream flows downstream from zones 10 and 11 into zone 12 and then 18. Carbon black-yielding feedstock, 40 is introduced at a first point 42, located in zone 12. Suitable for use as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like. In the examples described herein, carbon black-yielding feedstock, 40, was injected substantially transversely from the periphery of the stream of hot combustion gases in the form of a plurality of small jets which penetrated into the interior regions of the hot combustion gas stream to insure a high rate of mixing and shearing of the carbon black-yielding feedstock by the hot combustion gases, so as to decompose and convert the feedstock to produce carbon black. The distance from the end of the zone of converging diameter 11, to the first feedstock injection point 42, is shown as F-1.

The mixture of carbon black-yielding feedstock and hot combustion gases flows downstream from zone 12 into reaction zone 18. Reaction of the carbon black-yielding feedstock is initiated at the point of feedstock injection. Thus the reaction stream flowing through zone 18 is the reaction stream referred to in the description of the process and apparatus of the present invention.

According to the process of the present invention, an oxidant is introduced into the reaction stream. The point of oxidant injection, in the embodiment depicted in FIG. 1, is shown as 50. The distance from the beginning of zone 18, to the point of oxidant injection 50, is shown as X-1.

The oxidant may be introduced into the reaction stream in any manner known to the art. For example, the oxidant may be introduced by attaching a conduit to a port, or ports, through the walls of the reactor. The ports may be disposed in an annular ring around the circumference of zone 19. It is preferred that the oxidant be introduced in a manner which ensures rapid mixing of the oxidant and the reaction stream in order to generate a stream of combustion products to react the carbon black-yielding feedstock.

In the Examples described below, oxidant was introduced into the reaction stream through a plurality of radial ports peripherally disposed around the reactor.

Additional carbon black-yielding feedstock 60, is introduced into the reaction stream either substantially simultaneously with the oxidant, or subsequent to the introduction of the oxidant. In the Examples described below the feedstock was introduced subsequent to the introduction of the oxidant. The additional carbon black-yielding feedstock may be the same as or different from the carbon black-yielding feedstock, 40 introduced at the first feedstock injection point 42.

The point of the additional feedstock introduction is shown in FIG. 1 as 62. The distance between the point of oxidant introduction, 50, and the point of additional feedstock introduction 62, is shown as F-2. In the examples described herein, carbon black-yielding feedstock, 60, was injected substantially transversely from the periphery of the stream of hot combustion gases in the form of a plurality of small jets which penetrated into the interior regions of the hot combustion gas stream to insure a high rate of mixing and shearing of the carbon black-yielding feedstock by the hot combustion gases so as to decompose and convert the feedstock and produce additional carbon black.

The time between the introduction of the oxidant, and the introduction of the carbon black yielding feedstock, should allow sufficient time for the mixing of the oxidant and the reaction stream. Preferably, in the process of the present invention, the time is less than 30 milliseconds, more preferably less than 10 milliseconds, most preferably less than 5 milliseconds. Thus, preferably in the process of the present invention the distance F-2 is selected such that the time is less than 30 milliseconds. As will be understood by those of ordinary skill in the art, the relationship between the time, and the distance F-2 will depend on the configuration and dimensions of the reactor, in conjunction with the throughput level being utilized to practice the process of the present invention.

The reaction stream containing the additional carbon black-yielding feedstock flows into and through zones 30 and 32. Instead of quenching the reaction stream in zone 32, additional oxidant and feedstock may be introduced into this reaction stream to generate a stream of combustion products to react additional carbon black-yielding feedstock in further reactor zones to produce additional carbon black. These steps may be repeated as often as practicable.

In the embodiment depicted in FIG. 1, quench 70, located at point 72, injecting quenching fluid 80, is utilized to stop the reaction of the carbon black-yielding feedstock. Q is the distance from the beginning of stage 32, to point 72, and will vary according to the position of the quench.

After the reaction stream is quenched, the cooled gases containing the carbon blacks of the present invention pass downstream into any conventional cooling and separating means whereby the carbon blacks of the present invention are recovered. The separation of the carbon black from the gas stream is readily accomplished by conventional means such as a precipitator, cyclone separator and bag filter. This separation may be followed by pelletizing using, for example, a wet pelletizer.

The effectiveness and advantages of the present invention will be further illustrated by the following examples in which the cetyl-trimethyl ammonium bromide absorption value (CTAB) was determined according to ASTM Test Procedure D3765-85.

EXAMPLES 1–6

The process of the present invention was utilized to produce carbon black in five exemplary reactor runs, Example Runs 1–5. In carrying out Example Runs 1–5, no additional fuel was introduced into the reaction stream in the second zone of the reactor. For comparison purposes, a control run was conducted wherein carbon black was produced without introduction of oxidant and additional feedstock into the reaction stream, Example Run 6.

The reactor utilized in each example run and the control run was similar to the reactor generally described herein, and as depicted in FIG. 1, utilizing the reactor conditions and geometry set forth in Table 2. The fuel utilized in the combustion reaction in each of the examples was natural gas. The feedstock utilized in each of the Example Runs had the properties indicated in Table 1 below:

TABLE 1

Feedstock Properties

|  | Example Runs 1–4&6 | Example Run 5 |
|---|---|---|
| Hydrogen/Carbon Ratio | 0.95 | 0.96 |
| Hydrogen (wt. %) | 7.27 | 7.44 |
| Carbon (wt. %) | 91.6 | 92.2 |
| Sulfur (wt. %) | 0.9 | 0.6 |
| A.P.I. Gravity 15.6/15.6 C(60 F) [ASTM D-287] | −1.3 | −1.3 |
| Specific Gravity 15.5/15.6 C(60 F) [ASTM D-287] | 1.087 | 1.099 |
| Viscosity, SUS (54.4° C.) [ASTM D-88] | 163.8 | 106.0 |
| Viscosity, SUS (98.9° C.) [ASTM D-88] | 49.8 | 41.3 |
| BMCI (Visc-Grav) | 130 | 131 |
| Pounds carbon/gallon of feedstock | 8.30 | 8.35 |

The oxidant introduced into the reaction stream in Example Runs 1–5 was air. The oxidant was injected into the reaction stream through a plurality of peripherally disposed radial ports. In Example Runs 1–4 there were employed three 1 inch diameter ports, six ½ inch diameter ports, and six ¼ inch diameter ports, providing a combined air introduction area of approximately 3.8 square inches. In Example Run 5 there were employed three 1 inch diameter ports, three ¾ inch diameter ports, twelve ½ inch diameter ports, and six ¼ inch diameter ports, providing a combined air introduction area of approximately 6 square inches.

The reactor conditions and geometry are set forth in Table 2 below. In Example Run 5, ten pounds per hour of a water solution containing a total of 25 grams of $K_2CO_3$ was added to the second feedstock stream.

TABLE 2

|  | Example Runs | | | | | Control |
|---|---|---|---|---|---|---|
|  | Ex. 1 | Ex. 2 | Ex. 3 | Ex. 4 | Ex. 5 | Ex. 6 |
| D-1, in. | 8.75 | 8.75 | 8.75 | 8.75 | 8.75 | 8.75 |
| D-2, in. | 3.8 | 3.8 | 3.8 | 3.8 | 3.8 | 3.8 |
| D-3, in. | 3.8 | 3.8 | 3.8 | 3.8 | 3.8 | 3.8 |
| D-4, in. | 9 | 9 | 9 | 9 | 9 | 9 |
| D-5, in. | 8.3 | 8.3 | 8.3 | 8.3 | 8.3 | 8.3 |
| D-6, in. | 5.3 | 5.3 | 5.3 | 5.3 | 5.3 | 5.3 |
| D-7, in. | 5.3 | 5.3 | 5.3 | 5.3 | 5.3 | 5.3 |
| D-8, in. | 9 | 9 | 9 | 9 | 9 | 9 |
| L-1, in. | 24 | 24 | 24 | 24 | 24 | 24 |
| L-2, in. | 13 | 13 | 13 | 13 | 13 | 13 |
| L-3, in. | 8 | 8 | 8 | 8 | 8 | 8 |
| L-4, in. | 70 | 70 | 70 | 70 | 67 | * |
| L-5, in. | 12 | 12 | 12 | 12 | 12 | NA |
| L-6, in. | 2.88 | 2.88 | 2.88 | 2.88 | 2.88 | NA |
| L-7, in. | 1.5 | 1.5 | 1.5 | 1.5 | 1.5 | NA |

TABLE 2-continued

|  | Example Runs | | | | | Control |
|---|---|---|---|---|---|---|
|  | Ex. 1 | Ex. 2 | Ex. 3 | Ex. 4 | Ex. 5 | Ex. 6 |
| L-8, in. | 2 | 2 | 2 | 2 | 2 | NA |
| L-9, in. | 2.25 | 2.25 | 2.25 | 2.25 | 12.75 | NA |
| F-1, in. | 4 | 4 | 4 | 4 | 4 | 4 |
| F-2, in. | 6 | 6 | 6 | 6 | 16.5 | NA |
| X-1, in. | 80.5 | 80.5 | 80.5 | 80.5 | 67 | NA |
| Q, in. | 120 | 72 | 72 | 72 | 216 | 56 |
| 1st Zone | | | | | | |
| Comb. Air, kscfh | 45.0 | 45.2 | 45.0 | 35.0 | 35.0 | 100 |
| Comb. Air Preheat, F. | 896 | 902 | 886 | 876 | 900 | 907 |
| Nat. Gas, kscfh | 3.72 | 3.71 | 3.67 | 2.85 | 2.89 | 8.75 |
| Fstk Inj Pt. 42, Tips # × Size, in.) | 4 × 0.026 | 4 × 0.038 | 4 × 0.052 | 4 × 0.052 | 4 × 0.033 | 6 × 0.043 |
| Fstk Rate 42, gph | 45.1 | 71.2 | 97.7 | 76.0 | 72.0 | 169.7 |
| Fstk Press. 42, psig | 228 | 137 | 72 | 43 | 155 | 170 |
| Fstk Preheat, 42, F. | 251 | 248 | 243 | 243 | 310 | 297 |
| 2nd Zone | | | | | | |
| Air Entrance Area sq. in. | 3.8 | 3.8 | 3.8 | 3.8 | 6 | NA |
| Comb. Air, kscfh | 55.0 | 54.8 | 55.0 | 64.9 | 65.0 | NA |
| Comb. Air Preheat, F. | 966 | 994 | 1001 | 1093 | 1000 | NA |
| Fstk Inj. Pt. 62, Tips, # × Size, in.) | 7 × 0.043 | 7 × 0.029 | 7 × 0.029 | 7 × 0.029 | 7 × 0.037 | NA |
| Fstk Rate 62, gph | 163.8 | 118.3 | 111.6 | 99.6 | 143.0 | NA |
| Fstk Press. 62, psig | 184 | 310 | 283 | 223 | 203 | NA |
| Fstk Preheat 62, F. | 237 | 239 | 240 | 233 | 281 | NA |
| Temp. at Quench, F. | 1349 | 1351 | 1351 | 1350 | 1350 | 1350 |

*In control run 6, a single reactor stage, 18, was utilized. The reaction stream was quenched at the end of this reactor stage, thus L-4 = Q.
First Zone refers to the portion of the reactor upstream from the point of oxidant introduction in the Second Zone.
Second Zone refers to the portion of the reactor including, and downstream, of the point of oxidant introduction in the Second Zone.
Air entrance area refers to total combined surface area of the ports in the annular ring through which oxidant was introduced into the reaction stream in the Second Zone.
Inj. = Injection;
Comb. = combustion;
Press. = pressure;
Fstk = feedstock;
42 = Point 42 on FIG. 1;
62 = Point 62 on FIG. 1;
gph = gallons/hour;
psi = pounds/square inch;
in. = inches;
ft. = feet;
sq. in. = square inches;
F. = degrees Fahrenheit;
kscfh = standard cubic feet/hour, in 1000's;
NA = not applicable After quenching the process stream proceeded through typical downstream equipment utilized in carbon black production facilities for further cooling the reaction stream. The carbon blacks produced in each run were separated and collected using conventional means employing bag filters, and were then pelletized in a conventional manner using a wet pelletizer.

As shown in Table 2 the distance, F-2, between the centerline of the plane of the oxidant introduction ports (50 on FIG. 1) and the centerline of the plane of the second feedstock introduction ports (62 on FIG. 1) was 6 inches in Example Runs 1–4. The internal volume of the reactor between these two planes, in Example Runs 1–4, was approximately 247 cubic inches. The estimated time between the oxidant introduction and the feedstock introduction was about 0.6 milliseconds, in Example Runs 1–4, assuming the combustible gases from the reaction stream formed earlier are immediately burned to $CO_2$ and water. In Example Run 5 the distance, F-2, was 16.5 inches and the internal volume of the reactor between the plane of oxidant introduction and the plane of feedstock introduction, in Example Run 5, was approximately 788 cubic inches. The estimated time between the oxidant introduction and the feedstock introduction was about 2 milliseconds, in Example Run 5, assuming the combustible gases from the reaction stream formed earlier are immediately burned to $CO_2$ and water.

It should be appreciated that while the above description is particular to one type of apparatus, the invention is achieved through the mixing of the oxidant and the reaction stream to generate a stream of combustion products to react carbon black-yielding feedstock to produce carbon black.

The CTAB values of the dried carbon blacks produced in each exemplary run were determined by the aforementioned testing method. The carbon black yield (pounds of carbon black per gallon of feedstock) of each run was determined using gas chromatographic analysis of the flue gas exiting the bag filter, as well as occasional weight checks. The fuel used in each run, expressed as B.T.U. per pound of carbon black produced was also calculated for each example run. The results are set forth in Table 3.

TABLE 3

|  | Ex. 1 | Ex. 2 | Ex. 3 | Ex. 4 | Ex. 5 | Ex. 6 |
|---|---|---|---|---|---|---|
| CTAB ($m^2/g$) | 89 | 120 | 88 | 108 | 77 | 92 |
| Yield (lbs. c.b./gal. fstk) | 5.31 | 5.16 | 5.58 | 4.73 | 5.28 | 5.79 |
| Fuel Usage* (B.T.U./lb. c.b.) | 31360 | 32590 | 29800 | 34900 | 30770 | 34220 | lbs. c.b. = pounds of carbon black; qal. fstk = gallon of feedstock
c.b. = carbon black
*The Fuel Usage values were determined assuming values of 928 B.T.U./scf for natural gas (lower heating value) and 150,000 B.T.U./gallon for feedstock (lower heating value).

These results indicate that the fuel usage in each of Example Runs 1 and 3, which utilized the process of the present invention was significantly reduced in comparison with the fuel usage of the control run, Example Run 6.

A comparison of the multi-zone process of the present invention, Example Runs 1–5, and a single reaction zone process is set forth in Tables 4 and 5 below.

TABLE 4

|  | Ex. 1 Multi | Ex. 2 Multi | Ex. 3 Multi | Ex. 4 Multi | Ex. 5 Multi | Ex. 6 Single |
|---|---|---|---|---|---|---|
| TOTAL Air, kscfh | 100 | 100 | 100 | 99.9 | 100 | 100 |
| TOTAL Gas, kscfh | 3.72 | 3.71 | 3.67 | 2.85 | 2.89 | 8.75 |
| TOTAL Fstk, gph | 208.9 | 189.5 | 209.3 | 175.6 | 215 | 168.7 |
| Yield (pounds/gal. fstk) | 5.31 | 5.16 | 5.58 | 4.73 | 5.28 | 5.79 |
| Throughput (lb. c.b./hr.) | 1109 | 978 | 1168 | 830 | 1135 | 977 |
| CTAB ($m^2/g$) | 89 | 120 | 88 | 108 | 77 | 92 |
| Fuel Usage* (B.T.U./lb. c.b.) | 31360 | 32590 | 29800 | 34900 | 30770 | 34220 | lb. c.b. = pound of carbon black; gal. fstk = gallon of feedstock; Throughput = TOTAL Fstk × Yield
*The Fuel Usage values were determined assuming values of 928 B.T.U./scf for natural gas (lower heating value) and 150,000 B.T.U./gallon for feedstock (lower heating value).

It is estimated that to achieve the same yields and throughputs as shown in Example Runs 1–5, in a single stage process producing carbon blacks of the same respective CTAB surface areas, it would have required the amounts of air, gas and feedstock set forth in Table 5. The estimated fuel usage based on the estimated amounts of air, gas and feedstock is also set forth in Table 5. The percent reduction in fuel usage is additionally set forth in Table 5.

TABLE 5

|  | Ex. 1 | Ex. 2 | Ex. 3 | Ex. 4 | Ex. 5 | Ex. 6 |
|---|---|---|---|---|---|---|
|  |  | < Hypothetical Single Stage > |  |  |  | Single |
| Est. TOTAL Air, kscfh | 110.4 | 112.6 | 114.3 | 117.2 | 109.2 | 100 (actual) |
| Est. TOTAL Gas, kscfh | 7.59 | 8.01 | 8.99 | 8.2 | 6.53 | 8.75 (actual) |
| Est. TOTAL Fstk, gph | 208.9 | 189.5 | 209.3 | 175.6 | 215 | 168.7 (actual) |

TABLE 5-continued

|  | Ex. 1 | Ex. 2 | Ex. 3 | Ex. 4 | Ex. 5 | Ex. 6 |
|---|---|---|---|---|---|---|
|  |  | < Hypothetical Single Stage > |  |  |  | Single |
| Est. Fuel Usage (B.T.U./lb. c. b.) | 34600 | 36670 | 34030 | 40870 | 33750 | 34220 (actual) |
| % Reduction in Fuel Usage | 8.8 | 11.1 | 12.4 | 14.6 | 8.9 | N.A. |

A comparison of the results provided in Table 4, and the estimates provided in Table 5, shows that Example Runs 1–5, in Table 4, exemplary of the process of the present invention, achieved useful gains, on the order of 8 to 15%, in energy efficiency in comparison with a single reaction zone process making a similar carbon black.

It should be clearly understood that the forms of the present invention herein described are illustrative only and are not intended to limit the scope of the invention.

I claim:

1. A process for producing carbon black comprising:
   (a) forming a combustion gas stream by reacting a fuel with a first oxidant;
   (b) reacting a first carbon black yielding feedstock with the combustion gas stream to form a reaction stream containing a first carbon black;
   (c) reacting the reaction stream of step (b), downstream, with a second oxidant and a second carbon black yielding feedstock to produce additional carbon black;
   (d) carrying out the process of steps (a), (b), and (c) so that the amount of fuel utilized per pound of carbon black produced by the process of steps (a), (b), and (c) is less than the fuel utilized per pound of carbon black to form the first carbon black produced by the process of steps (a) and (b);
   (e) cooling, separating and recovering the carbon black formed by the process of steps (a) through (d), and further comprising introducing additional oxidant and additional carbon black yielding feedstock to produce additional carbon black prior to cooling, separating and recovering the carbon black.

2. A process for producing carbon black in a carbon black furnace reactor comprising:
   (a) forming a combustion gas stream by reacting a fuel with a first oxidant in a first zone of the reactor;
   (b) introducing a first carbon black-yielding feedstock into the combustion gas stream in a second zone of the reactor to form a reaction stream;
   (c) allowing formation of a first carbon black in the reaction stream of step (1) in a third zone of the reactor;
   (d) introducing a second oxidant into the reaction stream of step (c), downstream, in a fourth zone of the reactor to react with the reaction stream acting as a fuel to form a stream of combustion products;
   (e) introducing a second carbon black-vielding feedstock into the reaction and combustion stream of step (d) in a fifth zone to initiate the formation of additional carbon black;
   (f) allowing formation of carbon black in a sixth zone of the reactor;
   (g) carrying out the process of steps (a) through (f) so that the amount of fuel utilized per pound of carbon black produced by the process steps (a) through (f) is less than the fuel utilized per pound of carbon black to form the first carbon black produced by the process of steps (a) through (c); and
   (h) cooling, separating and recovering the carbon black, formed by the process of steps (a) through (g),
   wherein the carbon black formed by the process of steps (a) through (g) is carbon black of not less than substantially the same CTAB surface area as that formed by the process of steps (a) through (c).

3. A process for producing carbon black comprising:
   (a) forming a combustion gas stream by reacting a fuel with a first oxidant;
   (b) reacting a first carbon black yielding feedstock with the combustion gas stream to form a reaction stream containing a first carbon black;
   (c) reacting the reaction stream of step (b), downstream, with a second oxidant and a second carbon black yielding feedstock to produce additional carbon black;
   (d) carrying out the process of steps (a), (b), and (c) so that the amount of fuel utilized per pound of carbon black produced by the process of steps (a), (b), and (c) is less than the fuel utilized per pound of carbon black to form the first carbon black produced by the process of steps (a) and (b); and
   (e) cooling, separating and recovering the carbon black formed by the process of steps (a) through (d),
   wherein the carbon black formed by the process of steps (a) through (d) is carbon black of not less than substantially the same CTAB surface area as that formed by the process of steps (a) and (b).

4. The process of claim 3, wherein the reaction stream reacts with a second oxidant to form a stream of combustion products and wherein the combustion products in the reaction stream are then reacted with a second carbon black-yielding feedstock to produce additional carbon black.

5. A process for improving the yield of carbon black relative to fuel consumption in a process for producing carbon black in a carbon black furnace reactor, said process for improving comprising:
   (a) forming a combustion gas stream by reacting a fuel with a first oxidant;
   (b) introducing a first carbon black-yielding feedstock into the combustion gas stream of step (a) at a first rate to form a reaction stream;
   (c) allowing formation of a first carbon black in the reaction stream of step (b);
   (d) introducing a second oxidant into the reaction stream of step (c), downstream to react with the reaction steam acting as a fuel to form a stream of combustion products;
   (e) introducing a second carbon black-yielding feedstock into the stream of combustion products of step (d) at a second rate to initiate the formation of additional carbon black, wherein said second rate is from 114% to 363% greater than said first rate;

(f) allowing formation of carbon black;

(g) carrying out the process of steps (a) through (f) so that the amount of fuel utilized per pound of carbon black produced by the process steps (a) through (f) is less than the fuel utilized per pound of carbon black to form the first carbon black produced by the process of steps (a) through (c);

(h) cooling, separating and recovering the carbon black formed by the process of steps (a) through (g).

6. The process of claim 2 wherein the reduction in the amount of fuel is at least 2%.

7. A process for improving th yield of carbon black relative to fuel consumption in a process for producing carbon black, said process for improving comprising:

(a) forming a combustion gas stream by reacting a fuel with a first oxidant;

(b) reacting a first carbon black yielding feedstock at a first rate with the combustion gas stream to form a reaction stream containing a first carbon black;

(c) reacting the reaction stream of step (b), downstream, with a second oxidant and a second carbon black yielding feedstock introduced at a second rate to produce additional carbon black, wherein said second rate is from 114% to 363% greater than said first rate;

(d) carrying out the process of steps (a), (b), and (c) so that the amount of fuel utilized per pound of carbon black produced by the process of steps (a), (b), and (c) is less than the fuel utilized per pound of carbon black to form the first carbon black produced by the process of steps (a) and (b);

(e) cooling, separating and recovering the carbon black formed by the process of steps (a) through (d).

8. The process of claim 7, wherein the second oxidant and the second carbon black yielding feedstock are introduced into the upstream formed reaction stream within a time period sufficient to react the second oxidant with the reaction stream to generate a stream of combustion products to react the second carbon black yielding feedstock.

9. The process of claim 8, wherein the second carbon black yielding feedstock is introduced into the reaction stream downstream from the introduction of the second oxidant into the reaction stream.

10. The process of claim 8, wherein the introduction of the second oxidant and the introduction of the second carbon black yielding feedstock occur within a time period of less than 30 milliseconds.

11. The process of claim 8, wherein the introduction of the second oxidant and the introduction of the second carbon black yielding feedstock occur within a time period of less than 10 milliseconds.

12. The process of claim 8, wherein the introduction of the second oxidant and the introduction of the second carbon black yielding feedstock occur within a time period of less than 5 milliseconds.

13. The process of claim 7, wherein the reduction in the amount of fuel is at least 2%.

14. The process of claim 7, wherein steps (a) and (b) are carried out:

by reacting a fuel with a first oxidant and introducing a first carbon black-yielding feedstock into the combustion gas stream in a manner such that the first carbon black-yielding feedstock is atomized by the combustion gases.

* * * * *